United States Patent
Hermann et al.

(10) Patent No.: US 11,142,160 B2
(45) Date of Patent: Oct. 12, 2021

(54) BELT TONGUE HAVING A COVER

(71) Applicant: Autoliv Development AB, Vargarda (SE)

(72) Inventors: Michel Hermann, Pinneberg (DE); Robert Berg, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 16/648,260

(22) PCT Filed: Sep. 17, 2018

(86) PCT No.: PCT/EP2018/075024
§ 371 (c)(1),
(2) Date: Mar. 18, 2020

(87) PCT Pub. No.: WO2019/053245
PCT Pub. Date: Mar. 21, 2019

(65) Prior Publication Data
US 2020/0238947 A1    Jul. 30, 2020

(30) Foreign Application Priority Data
Sep. 18, 2017   (DE) .......................... 102017121613.8

(51) Int. Cl.
*B60R 22/18* (2006.01)
*A44B 11/00* (2006.01)

(52) U.S. Cl.
CPC ............ *B60R 22/18* (2013.01); *A44B 11/006* (2013.01); *B60R 2022/1812* (2013.01)

(58) Field of Classification Search
CPC .......... A44B 11/006; B60R 2022/1812; B60R 22/18; B60R 22/1855
See application file for complete search history.

(56) References Cited

U.S. PATENT DOCUMENTS 4,480,854 A * 11/1984 Doty ...................... A44B 11/10
                                                                    24/171
4,588,207 A *  5/1986 Doty ...................... A44B 11/10
                                                                    24/171
(Continued)

FOREIGN PATENT DOCUMENTS

| DE | 10 2006 033544 A1 | 1/2008 |
| DE | 10 2014 114207 A1 | 3/2016 |
| WO | 2012/105762 A2 | 8/2012 |

OTHER PUBLICATIONS

International Search Report of the International Searching Authority for PCT/EP2018/075024 dated Nov. 30, 2018.
(Continued)

*Primary Examiner* — David M Upchurch
(74) *Attorney, Agent, or Firm* — Dickinson Wright PLLC

(57) ABSTRACT

A belt tongue (1) having a tongue body (3) extending in an insertion direction (2), forming a belt slot (4) for guiding a belt crosswise to an insertion direction (2), and a blocking element (5), movably arranged in the tongue body (3) The belt is movable through the belt slot (4) in an unloaded pass-through position of the blocking element (5) and its mobility is at least inhibited by the blocking element (5) in a loaded position, created by a tensile force introduced into the belt. The belt is deflected by the belt tongue (1) in the fastened state in a loop shape. A cover (6) is provided at least on one side of the tongue body (2) and is arranged having at least one partial section (7) under the belt slot (4), and the partial section (7) directly adjoins the belt slot (4) and covers at least one part of the blocking element (5) in the pass-through position.

8 Claims, 3 Drawing Sheets

(56) References Cited

U.S. PATENT DOCUMENTS

Figure 1:
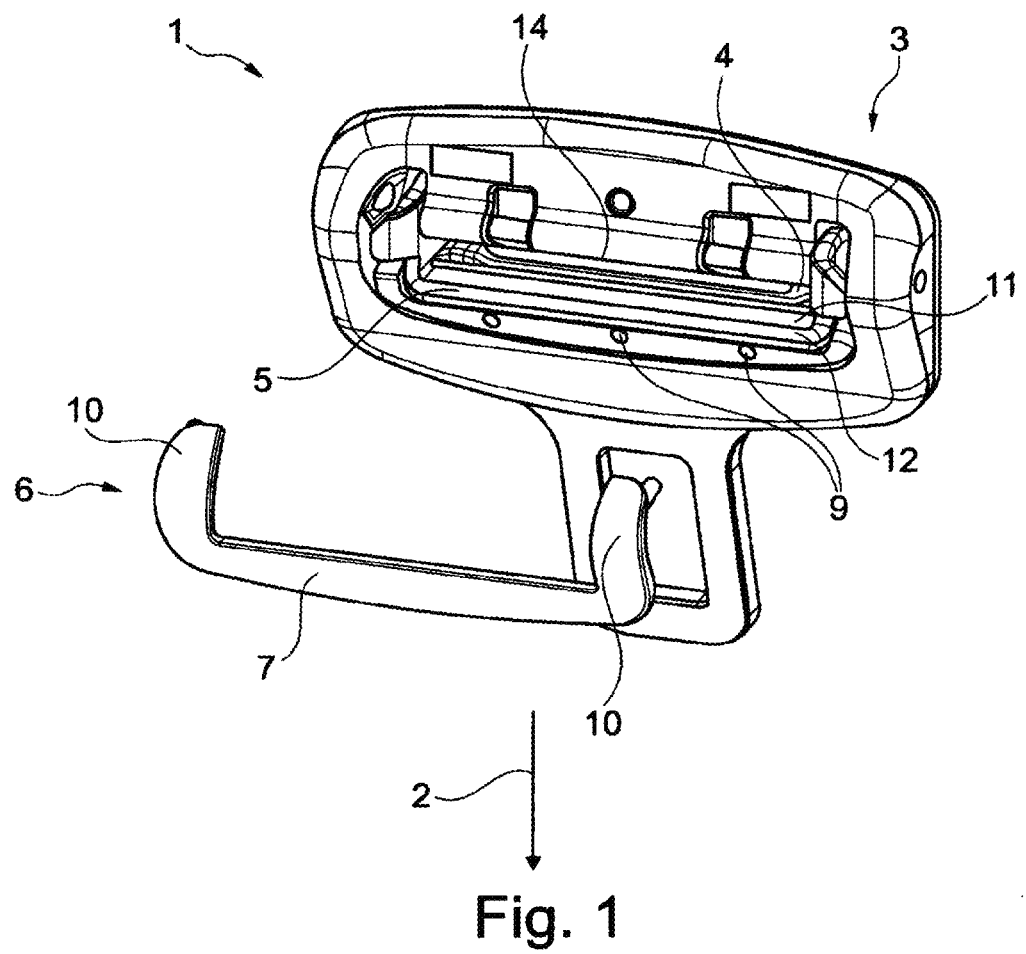

| | | | | |
|---|---|---|---|---|
| 5,100,176 A * | 3/1992 | Ball | ................... | A44B 11/2557 24/171 |
| 5,309,606 A * | 5/1994 | Kawamura | ............ | A44B 11/10 24/171 |
| 5,806,148 A * | 9/1998 | McFalls | ............. | A44B 11/2561 24/168 |
| 6,581,968 B1 * | 6/2003 | Grace | ..................... | B60R 22/12 280/801.1 |
| 7,520,035 B2 * | 4/2009 | Ichida | ................ | A44B 11/2561 24/593.1 |
| 7,716,795 B2 * | 5/2010 | Versellie | ............ | A44B 11/2561 24/593.1 |
| 7,871,132 B2 * | 1/2011 | Rogers | .................. | B60R 22/185 297/469 |
| 8,382,160 B2 * | 2/2013 | Disley | ................ | A44B 11/2561 280/808 |
| 9,409,537 B2 * | 8/2016 | Zhang | .................... | B60R 22/24 |
| 10,611,334 B2 * | 4/2020 | Eaton | ................. | B60R 22/206 |
| 2015/0173461 A1 * | 6/2015 | Okano | .............. | A44B 11/2546 24/593.1 |
| 2017/0055643 A1 * | 3/2017 | Knoedl | ............. | A44B 11/2557 |

OTHER PUBLICATIONS

English Translation of International Search Report of the International Searching Authority for PCT/EP2018/075024 dated Nov. 30, 2018.

* cited by examiner

BELT TONGUE HAVING A COVER

The present invention relates to a belt tongue having a tongue body which extends in an insertion direction and in which a belt slot for passing a belt strap through is formed crosswise to the insertion direction, and a blocking element, movably arranged in the tongue body, wherein the belt is movable through the belt slot in an unloaded pass-through position of the blocking element, and the mobility thereof is at least inhibited by means of the blocking element in a loaded position created by a tensile force introduced into the belt, wherein the belt is deflected by the belt tongue in the fastened state in a loop shape.

A belt tongue with the features mentioned at the outset is known from DE 198 22 473 A1, with which a blocking element designed as a clamping element is arranged rotatably about an axis. When the belt force exceeds a predetermined value, the clamping element pivots about its axis and clamps the belt with a clamping edge against a clamping jaw of the tongue body. It has now been found that the forces occurring in the event of an accident are such that the belt tongue is deformed, wherein the clamping edge of the clamping element does not clamp the belt securely against the clamping jaw.

Therefore, EP 2 377 417 B1 discloses a belt tongue with which the deflection element is moved from the pass-through position into the loaded position along a contact surface of the tongue body, so that a scissors-like sliding edge is formed for the belt, through which the belt runs and in which the belt with its sides is in planar contact with the contact surface of the tongue body or with the narrowing section of the blocking element. However, due to the location of the blocking element with its convex outer surface on the tongue body, this belt tongue is built relatively large and asymmetrical. With this belt tongue, the convex cavity into which the belt slots oriented upward and toward the front open and in which the blocking element is arranged is closed at the front side of the tongue body by a cover.

The object of the present invention is to at least partially solve the problems described with reference to the prior art and in particular to specify a belt tongue which imparts a compact overall impression.

The object is achieved by a belt tongue with the features of the independent claim. Advantageous developments of the belt tongue are specified in the dependent claims and in the description, wherein individual features of the advantageous developments can be combined with one another as desired in a technically sensible manner.

The object is achieved in particular by a belt tongue with the above-mentioned features, with which a cover is provided on at least one side of the tongue body and the cover is arranged at least with a section below the belt slot, wherein the section of the cover arranged below the belt slot immediately adjoins the belt slot and covers at least a part of the blocking element located in the pass-through position.

The directional data relate to the insertion direction of the belt tongue, so that the section of the lock tongue to be inserted into the belt buckle is arranged at the bottom and the section having the belt slot is arranged at the top of the belt tongue. The side of the belt tongue which faces the occupant in the buckled state when the belt tongue is arranged in the region of the B column is considered to be the front side. The rear side is thus the side facing the B column in the buckled position.

The invention relates in particular to such belt tongues with which the belt slot extends from the rear side to the front side. The cover is therefore located on the front side or on the rear side directly below the belt slot, which opens out on one of these sides. The belt is therefore in particular not guided out of the belt tongue on an upper side.

By arranging the cover underneath the belt slot on the front or rear side, a compact overall impression is given in the case of belt tongues which have a blocking element, wherein a section or part of the blocking element is arranged behind the cover in such a way that it is not visible to an occupant during normal use, in particular in the unbuckled state. In particular, the cover is arranged on a front side of the belt tongue facing the occupant in the unbuckled state. However, the cover can also be arranged on the rear side or a cover can be arranged on the front and rear sides in each case. In addition, the cover makes it possible to easily cover a recess arranged on the front or rear side for mounting the blocking element after assembly. The cover thus directly delimits the belt slot on the front or rear side. It can also be provided that the cover extends at least partially from the front side or rear side into the tongue body at least partially and thus at least partially through the tongue body parallel to the belt slot.

In one embodiment, the blocking element has a recess, through which the belt can be guided in particular inside the belt slot, so that a first part of the blocking element, which is formed outside the loop of the belt formed at least in the buckled state, and a second part of the blocking element spaced apart from the first part by the recess are arranged within the loop of the belt formed at least in the buckled state, wherein the cover covers the first part. The first part of the blocking element is thus arranged below the belt loop.

The first part of the blocking element can particularly preferably form with its first part a narrowing section which can be moved from the pass-through position into the loaded position along a contact surface of the tongue body, so that the belt is in planar contact with a belt section both with the contact surface of the tongue body and with the narrowing section of the blocking element, wherein the narrowing section is covered by the cover at least in the pass-through position of the blocking element. In the loaded position, the narrowing section and the contact surfaces therefore form a scissors-like sliding edge which inhibits the movement of the belt. In this connection, it is particularly preferred if, at least in the loaded position, the tongue body engages with a region having the contact surface through at least one section, in particular through the recess of the blocking element discussed above. In the loaded position, the section of the tongue body which has the contact surface is therefore arranged in the recess, through which the belt is also guided. The scissors-like sliding surface is formed between the contact surface and the corresponding section of the tongue body.

For simple assembly, it is preferred that the cover is fixed in a forced-fitting manner to the tongue body, wherein the cover is fixed in a force-fitting manner in particular by means of projections arranged below the belt slot and interacting with corresponding recesses. Thus, the projections can be formed on the cover, while the complementary recesses are formed on the tongue body, or vice versa.

In a further embodiment, it can be provided that the cover is U-shaped and the legs adjoin the belt slot laterally, wherein the section of the cover connecting the legs are arranged below the belt buckle. The legs of the U-shaped cover are thus arranged laterally of the belt slot and cover sections of the blocking element. In particular, the legs of the U-shaped cover with its ends can extend up to an upwardly directed surface portion of the tongue body, wherein the surfaces of the ends of the legs are also directed upward.

Thus, elements of the blocking element that are visible from above can otherwise also be covered by the legs. Projections can be provided on the legs for the additional force-fitting fixing of the cover to the tongue body.

To carry out the covering in a U-shaped manner, it can be expedient in particular if stop elements projecting to the outside are formed on the blocking element, which stop elements are in contact with counter stop surfaces on the tongue body in the loading position, wherein the counter stop surfaces are arranged laterally of the belt slot. In this connection, alternatively or even without covering and thus without realizing the above solution, it can be provided that, in each case, one cap is applied to the stop elements of the blocking element, wherein the cap has a dark hue, in particular corresponding to the hue of the encapsulation of the belt tongue, so that the stop elements are not easily recognizable to the occupant.

In particular, even independently of the above-described solution, it can also be achieved by painting the blocking element in a dark hue that the blocking element is not readily detectable for occupants, in particular in the unbuckled position. In particular, only partial regions of the blocking element can also be painted.

It can also be provided that the belt can be guided through the cover, so that the cover encloses the belt slot on the side of the tongue body and the belt slot is delimited completely circumferentially by the cover on the corresponding side of the tongue body.

The tongue body is formed in particular by a plate made of metal and a plastic encapsulation at least partially surrounding the plate.

Figure 2:
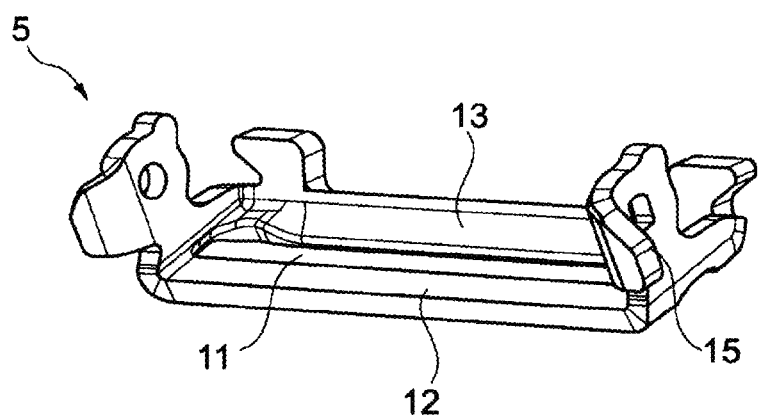
Figure 3:
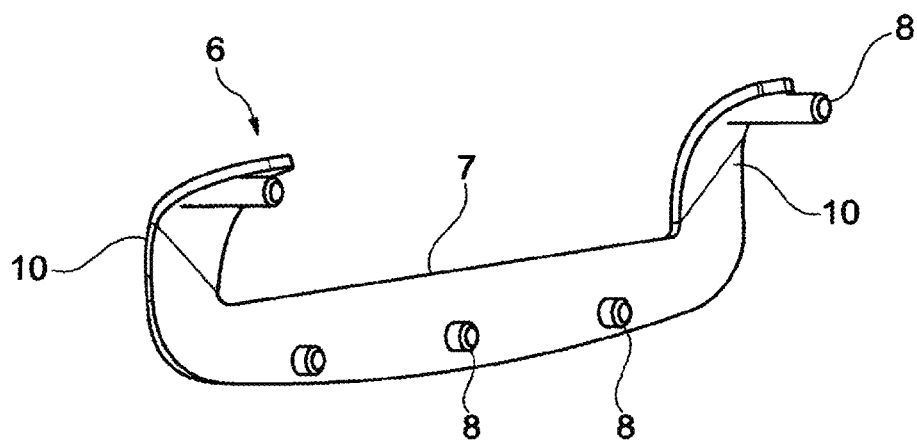
Figure 4:
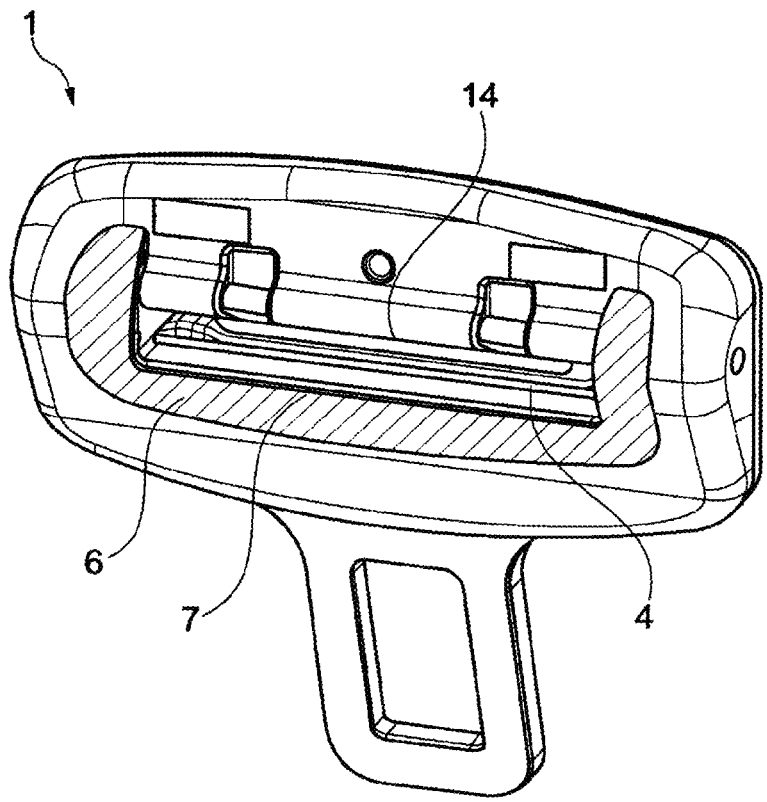

The invention and the technical environment are explained below by way of example with reference to the figures. The following are shown schematically:

FIG. 1: a partial exploded view of a belt tongue,

FIG. 2: a locking element of the belt tongue,

FIG. 3: a rear view of a cover of the belt tongue,

FIG. 4: a perspective view of the belt tongue with mounted cover; and

Figure 5:
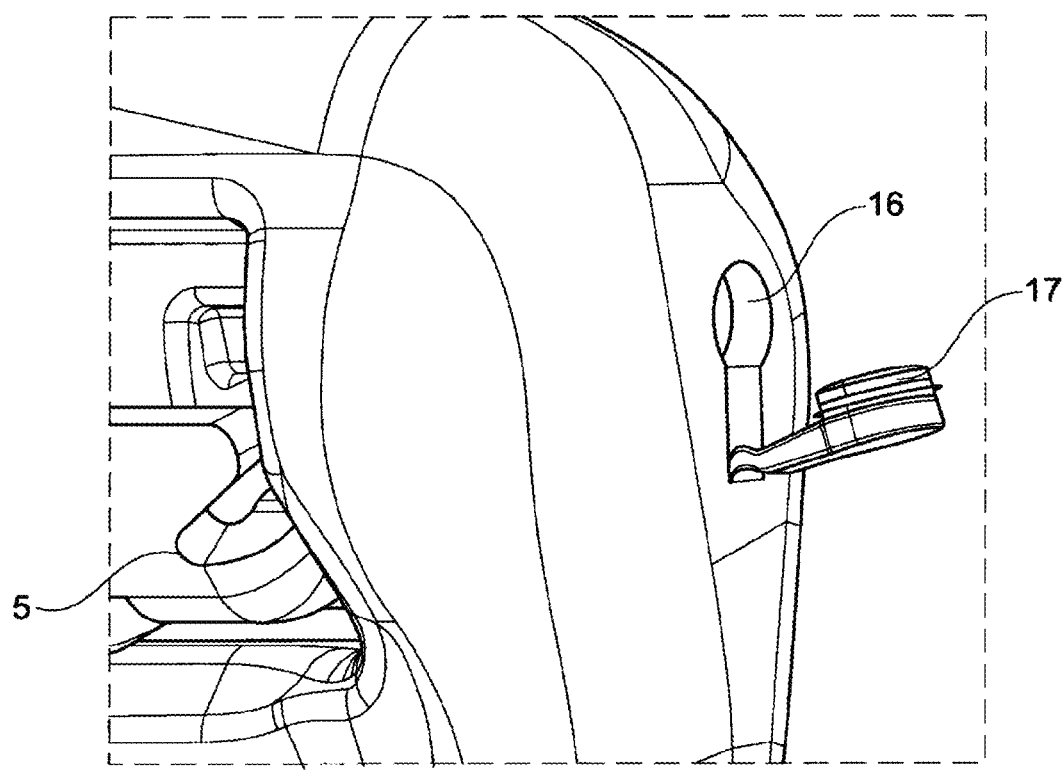

FIG. 5: a detailed view of another embodiment of a belt tongue.

FIGS. 1 and 4 show a belt tongue 1 having a tongue body 3 which extends into an insertion direction 2 and which comprises a plate and an encapsulation. A belt slot 4 running crosswise to the insertion direction 2 is formed in the tongue body 3. A blocking element 5 shown individually in FIG. 2 is movably arranged in the tongue body 3.

The blocking element 5 comprises a first part 12 and a second part 13 which are spaced apart by a recess 11. The belt, not shown, is guided through the recess 11. The blocking element 5 additionally comprises laterally projecting stop elements 15, wherein counter stop surfaces are formed in the encapsulation of the tongue body 3 with which the stop elements 15 of the blocking element come into contact in the loaded position. The blocking element 5 is rotatably mounted in the tongue body 3 by means of a torsion bar. When a tensile force is introduced into the belt in the buckled state, the force acting on the second part 13 from the belt causes the blocking element 5 to pivot, as a result of which the first part 12 of the blocking element 5 forming a narrowing section is moved along a contact surface 14 of the lock body 3, thereby forming a scissors-like sliding edge for the belt between the contact surface 14 and the first part 12 of the blocking element. The movement of the belt is at least inhibited, if not completely prevented, by this sliding edge.

A cover 6 shown in detail in FIG. 3 can be attached to the tongue body 3. The cover 6 is U-shaped and has a section 7 and two legs 10 protruding therefrom. On a side facing the tongue body 3, the cover 6 has projections 8 which can be inserted into corresponding recesses 9 on the tongue body 3 for force-fitting fixing of the cover 6. As can be seen from FIG. 4, the section 7 adjoins the belt slot 4 directly, so that the first part 12 of the blocking element 5 is covered by the section 7. The legs 10 of the cover 6 extend laterally along the belt slot 4 and cover the stop elements 15. The legs 10 extend with their ends towards a top of the belt tongue 1, so that the surfaces of the ends face upwards.

It can be seen from FIG. 5 that an opening 16 for inserting a torsion bar is formed in the encapsulation of the tongue body 3. The opening 16 can be closed by a closure 17 integrally molded onto the encapsulation of the tongue body 3. It would also be conceivable for an opening 16 in the encapsulation of the lock tongue 1 to be closed by first forming a collar around the opening 16, which collar is pressed into the opening 16 by means of a punch for the purpose of closing. It would also be conceivable for the opening 16 to be closed by a plug which is introduced into the opening 16. For this purpose, for example, a piece of a wire could be separated from a corresponding material and introduced into the opening.

LIST OF REFERENCE SIGNS

Belt tongue
2 Insertion direction
3 Tongue body
4 Belt slot
5 Blocking element
6 Cover
7 Section
8 Projection
9 Recess
10 Leg
11 Recess
12 First part
13 Second part
14 Contact surface
15 Stop element
16 Opening
17 Closure

The invention claimed is:

1. A buckle tongue with a tongue body extending in a plug-in direction, having a belt slot formed in the tongue body transversely to the plug-in direction for guiding a belt strap therethrough, comprising a blocking element arranged movably in the tongue body, wherein the belt strap is movable through the belt slot in an unloaded passage position of the blocking element and is at least inhibited in its mobility by the blocking element in a loading position brought about by a tensile force introduced into the belt strap, wherein the belt strap in a fastened state is deflected by the buckle tongue in the form of a loop, wherein a cover is provided at least on one side of the tongue body and the cover is arranged at least with a subsection below the belt slot, wherein the subsection of the cover arranged below the belt slot directly adjoins the belt slot and covers at least a part of the blocking element located in the unloaded passage position, wherein the cover is formed U-shaped and having limbs which laterally adjoin the belt slot, and wherein the limbs cover sections of the blocking element arranged on sides of the belt slot.

2. The buckle tongue according to claim 1, wherein the cover is fixed on the tongue body in a force-locking manner.

3. The buckle tongue according to claim 2, wherein the cover is fixed in the force-locking manner by one or more projections arranged below the belt slot and interacting with corresponding one or more recesses.

4. A buckle tongue with a tongue body extending in a plug-in direction, having a belt slot is formed in the tongue body transversely to the plug-in direction for guiding a belt strap therethrough, comprising a blocking element arranged movably in the tongue body, wherein the belt strap is movable through the belt slot in an unloaded passage position of the blocking element and is at least inhibited in its mobility by the blocking element in a loading position brought about by a tensile force introduced into the belt strap, wherein the belt strap in a fastened state is deflected by the buckle tongue in the form of a loop, wherein a cover is provided at least on one side of the tongue body and the cover is arranged at least with a subsection below the belt slot, wherein the subsection of the cover arranged below the belt slot directly adjoins the belt slot and covers at least a part of the blocking element located in the unloaded passage position, wherein the cover is formed U-shaped and having limbs which laterally adjoin the belt slot, and wherein the limbs extend as far as a surface section of the tongue body directed upwards and the surfaces of ends of the limbs are directed upwards.

5. The buckle tongue according to claim 1, wherein the cover encloses the belt slot on the side of the tongue body, so that the belt slot is delimited fully by the cover on the side of the tongue body.

6. A buckle tongue with a tongue body extending in a plug-in direction, having a belt slot is formed in the tongue body transversely to the plug-in direction for guiding a belt strap through, comprising a blocking element arranged movably in the tongue body, wherein the belt strap is movable through the belt slot in an unloaded passage position of the blocking element and is at least inhibited in its mobility by the blocking element in a loading position brought about by a tensile force introduced into the belt strap, wherein the belt strap in a fastened state is deflected by the buckle tongue in the form of a loop, wherein a cover is provided at least on one side of the tongue body and the cover is arranged at least with a subsection below the belt slot, wherein the subsection of the cover arranged below the belt slot directly adjoins the belt slot and covers at least a part of the blocking element located in the unloaded passage position, wherein the blocking element has a recess, through which the belt strap can be guided, so that a first part of the blocking element is arranged outside the loop of the belt strap formed at least in the fastened state and a second part of the blocking element, which is spaced from the first part by the recess, is arranged inside the loop of the belt strap formed at least in the fastened state, wherein the cover covers the first part.

7. The buckle tongue according to claim 1, wherein the blocking element is movable from the unloaded passage position into the loading position with a narrowing section along a contact surface of the tongue body, so that in the loading position the belt strap is in two-dimensional contact by a belt strap section both with the contact surface of the tongue body and with the narrowing section of the blocking element, wherein the narrowing section is covered, at least in the unloaded passage position of the blocking element, by the cover.

8. A buckle tongue with a tongue body extending in a plug-in direction, having a belt slot is formed in the tongue body transversely to the plug-in direction for guiding a belt strap through, comprising a blocking element arranged movably in the tongue body, wherein the belt strap is movable through the belt slot in an unloaded passage position of the blocking element and is at least inhibited in its mobility by the blocking element in a loading position brought about by a tensile force introduced into the belt strap, wherein the belt strap in a fastened state is deflected by the buckle tongue in the form of a loop, wherein a cover is provided at least on one side of the tongue body and the cover is arranged at least with a subsection below the belt slot, wherein the subsection of the cover arranged below the belt slot directly adjoins the belt slot and covers at least a part of the blocking element located in the unloaded passage position, wherein the blocking element is movable from the unloaded passage position into the loading position with a narrowing section along a contact surface of the tongue body, so that in the loading position the belt strap is in two-dimensional contact by a belt strap section both with the contact surface of the tongue body and with the narrowing section of the blocking element, wherein the narrowing section is covered, at least in the unloaded passage position of the blocking element, by the cover, and wherein at least in the loading position the tongue body with a region comprising the contact surface engages through at least one section of the blocking element.

\* \* \* \* \*